US012047784B2

(12) United States Patent
Harada et al.

(10) Patent No.: US 12,047,784 B2
(45) Date of Patent: Jul. 23, 2024

(54) TERMINAL, RADIO COMMUNICATION METHOD AND SYSTEM USING A SENSING CHANNEL

(71) Applicant: NTT DOCOMO, INC., Tokyo (JP)

(72) Inventors: Hiroki Harada, Tokyo (JP); Daisuke Murayama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 484 days.

(21) Appl. No.: 17/421,564

(22) PCT Filed: Jan. 9, 2019

(86) PCT No.: PCT/JP2019/000353
§ 371 (c)(1),
(2) Date: Jul. 8, 2021

(87) PCT Pub. No.: WO2020/144763
PCT Pub. Date: Jul. 16, 2020

(65) Prior Publication Data
US 2022/0095118 A1    Mar. 24, 2022

(51) Int. Cl.
*H04W 16/14* (2009.01)
*H04L 5/00* (2006.01)
(Continued)

(52) U.S. Cl.
CPC ....... *H04W 16/14* (2013.01); *H04W 72/0446* (2013.01); *H04W 72/23* (2023.01)

(58) Field of Classification Search
CPC ... H04W 16/14; H04W 72/04; H04W 72/044; H04W 72/0446; H04W 72/12; H04W 72/20; H04W 72/23; H04W 72/54
See application file for complete search history.

(56) References Cited

U.S. PATENT DOCUMENTS

2017/0230994 A1*  8/2017  You ................. H04L 5/0053
2017/0310434 A1* 10/2017  Harada ............ H04W 72/0473
(Continued)

FOREIGN PATENT DOCUMENTS

JP    2017/085528 A    5/2017
WO    2016/072220 A1   5/2016

OTHER PUBLICATIONS

International Search Report issued in PCT/JP2019/000353 on Mar. 26, 2019 (1 page).
(Continued)

*Primary Examiner* — Jenee Holland
(74) *Attorney, Agent, or Firm* — Osha Bergman Watanabe & Burton LLP

(57) ABSTRACT

A user terminal includes: a receiving section that receives a synchronization signal block, receives a downlink control channel corresponding to the synchronization signal block, and receives a downlink shared channel corresponding to the synchronization signal block; and a control section that performs operation of at least one of interpretation of downlink control information indicating a time domain resource of the downlink shared channel in the downlink control channel, determination of a monitoring occasion of the downlink control channel, rate matching of the downlink shared channel, and determination of a transmission candidate resource of the synchronization signal block. Operation in a first carrier to which sensing is applied is different from operation in a second carrier to which sensing is not applied. According to an aspect of the present disclosure, appropriate communication can be performed in a carrier to which sensing of a channel is applied.

4 Claims, 15 Drawing Sheets

(51) Int. Cl.
    *H04L 27/00*     (2006.01)
    *H04W 56/00*     (2009.01)
    *H04W 72/0446*     (2023.01)
    *H04W 72/23*     (2023.01)

(56) References Cited

U.S. PATENT DOCUMENTS

| | | | | |
|---|---|---|---|---|
| 2018/0007709 | A1* | 1/2018 | Seo | H04W 72/20 |
| 2018/0013529 | A1* | 1/2018 | You | H04W 72/23 |
| 2018/0198594 | A1* | 7/2018 | Tiirola | H04L 5/0051 |
| 2018/0234998 | A1* | 8/2018 | You | H04W 72/1273 |
| 2018/0309532 | A1* | 10/2018 | Shimezawa | H04J 1/18 |
| 2018/0317092 | A1* | 11/2018 | Harada | H04L 5/0053 |
| 2018/0376497 | A1* | 12/2018 | You | H04L 5/0055 |
| 2020/0045696 | A1* | 2/2020 | Huang | H04L 5/10 |
| 2020/0351847 | A1* | 11/2020 | Kim | H04L 5/0094 |
| 2021/0307068 | A1* | 9/2021 | Kim | H04B 7/0695 |
| 2022/0248450 | A1* | 8/2022 | Kim | H04L 5/0094 |

OTHER PUBLICATIONS

Written Opinion of the International Searching Authority issued in PCT/JP2019/000353 on Mar. 26, 2019 (5 pages).
Spreadtrum Communications; "Discussion on DRS in NR-U"; 3GPP TSG RAN WG1 Meeting #95, R1-1813077; Spokane, USA; Nov. 12-16, 2018 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).
Office Action issued in Japanese Patent Application No. 2020-565067, dated Dec. 27, 2022 (7 pages).
Extended European Search Report issued in European Application No. 19908706.5 mailed on Oct. 4, 2022 (12 pages).
Partial Supplementary European Search Report issued in European Application No. 19908706.5 mailed on Jun. 30, 2022 (15 pages).
Qualcomm Incorporated, "DL signals and channels for NR-U", 3GPP TSG RAN WG1 Meeting #95, R1-1813411, Spokane, USA, Nov. 12-16, 2018 (8 pages).

* cited by examiner

| Index | O | Number of search space sets per slot | M | First symbol index |
|---|---|---|---|---|
| 0 | 0 | 1 | 1 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

FIG. 2

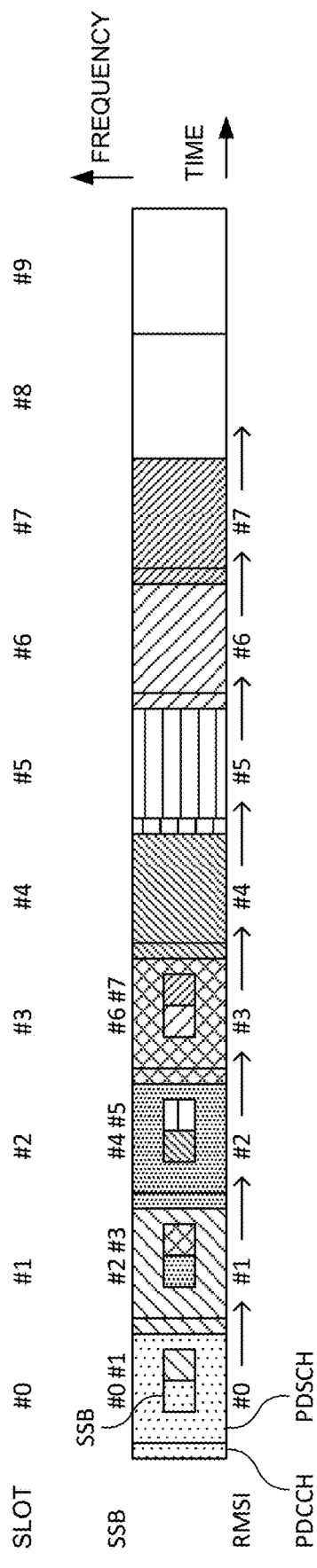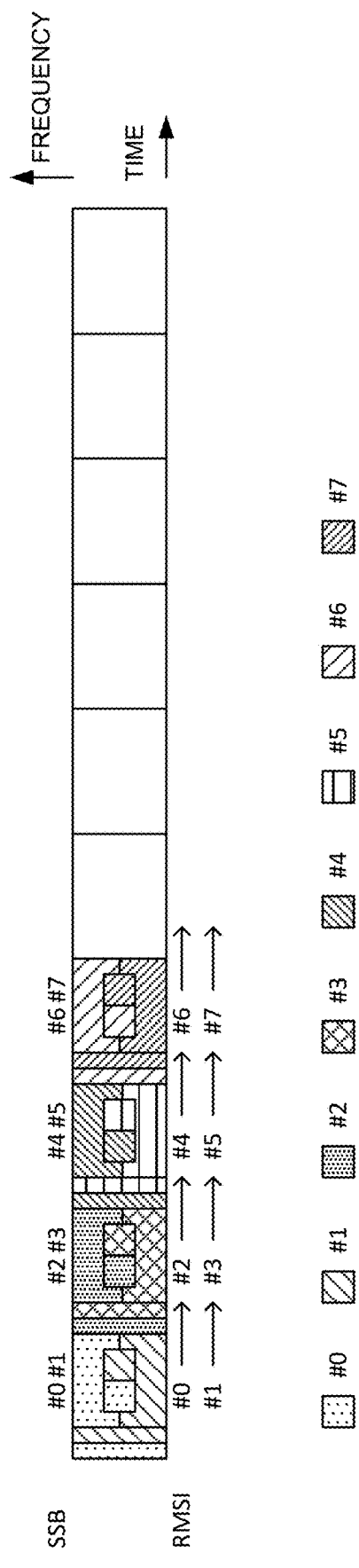

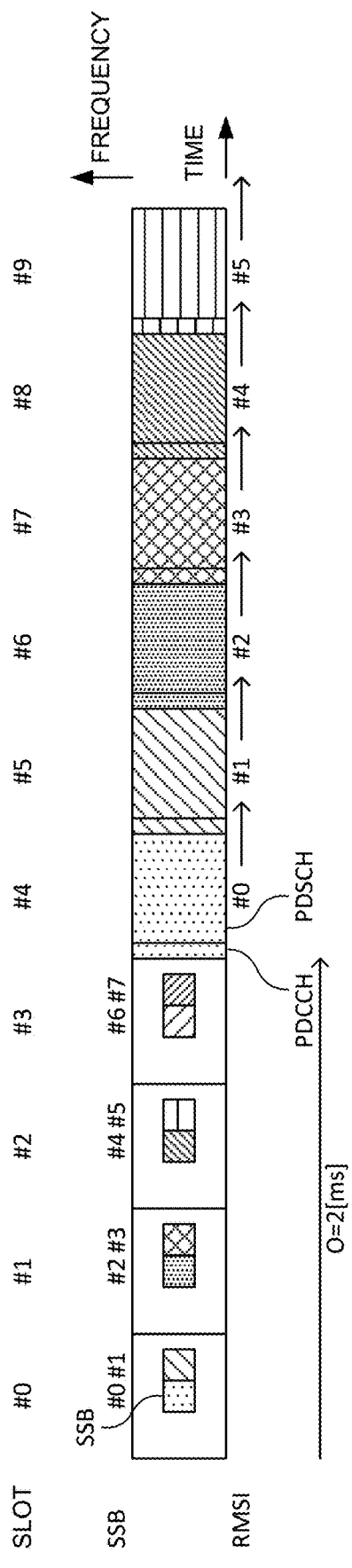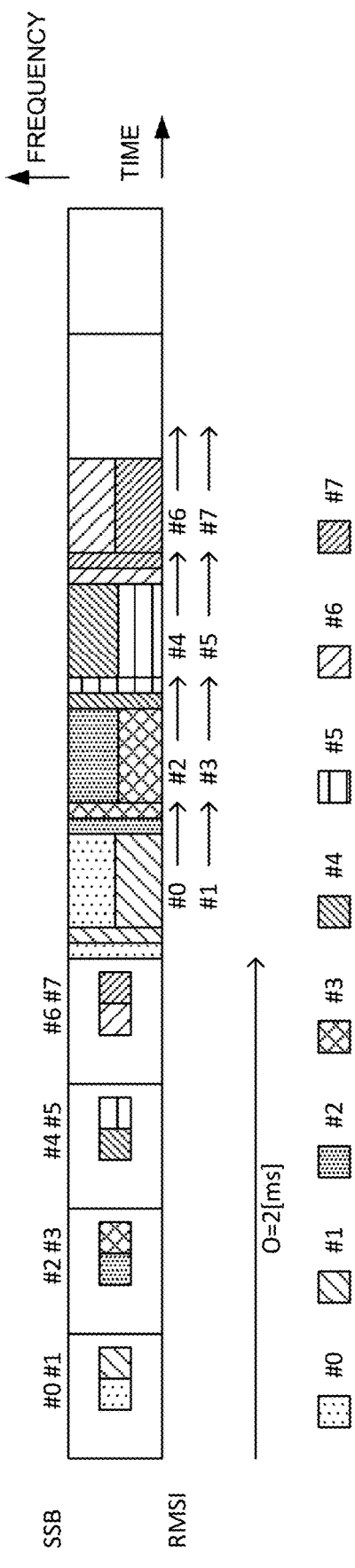

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0 common | 1 | - | - | Default A for normal CP |
| | | 2 | - | - | Default B |
| | | 3 | - | - | Default C |

FIG. 5

| Row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type B | 0 | 2 | 4 |
| 15 | 2,3 | Type B | 0 | 4 | 7 |
| 16 | 2,3 | Type B | 0 | 8 | 4 |

FIG. 6

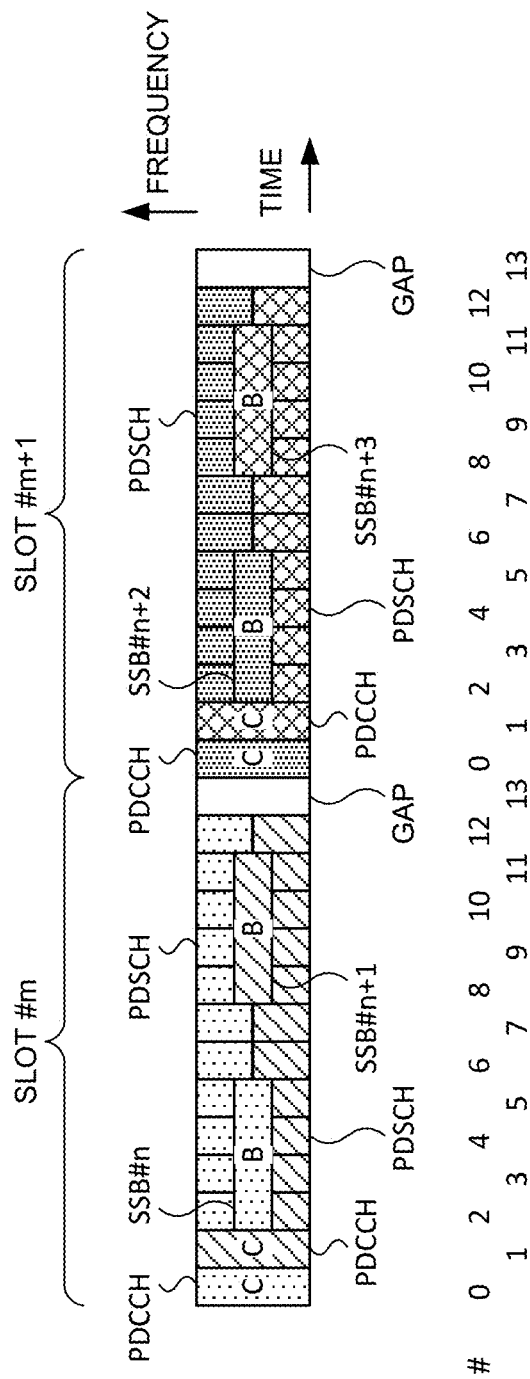
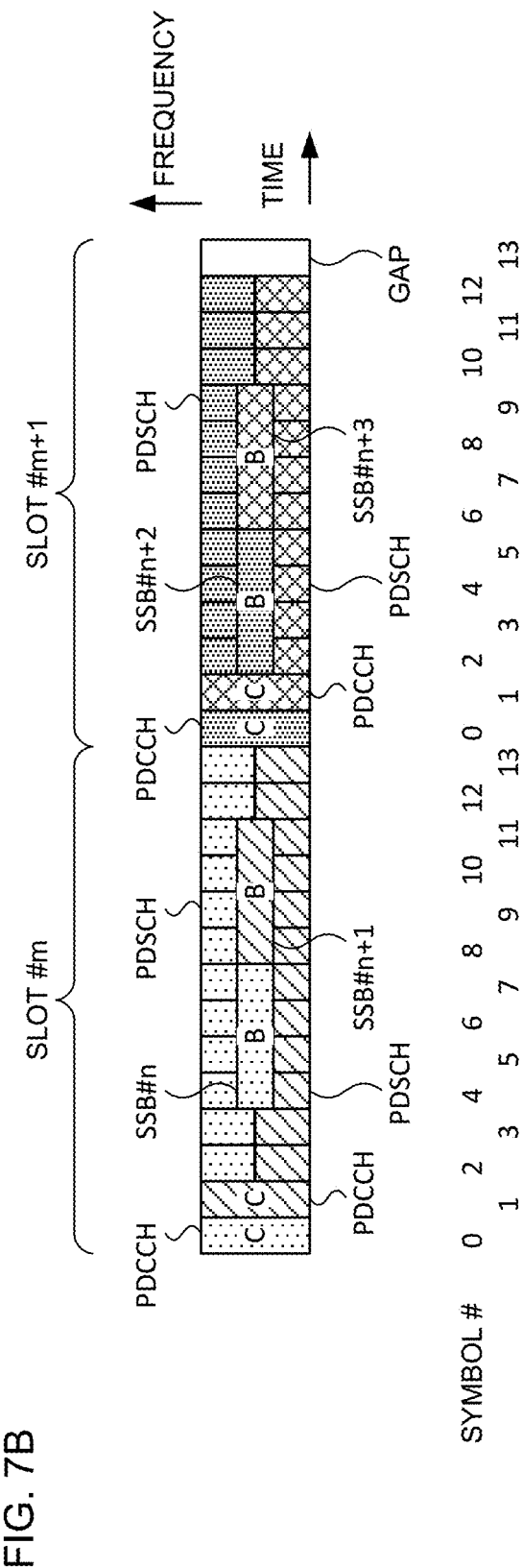

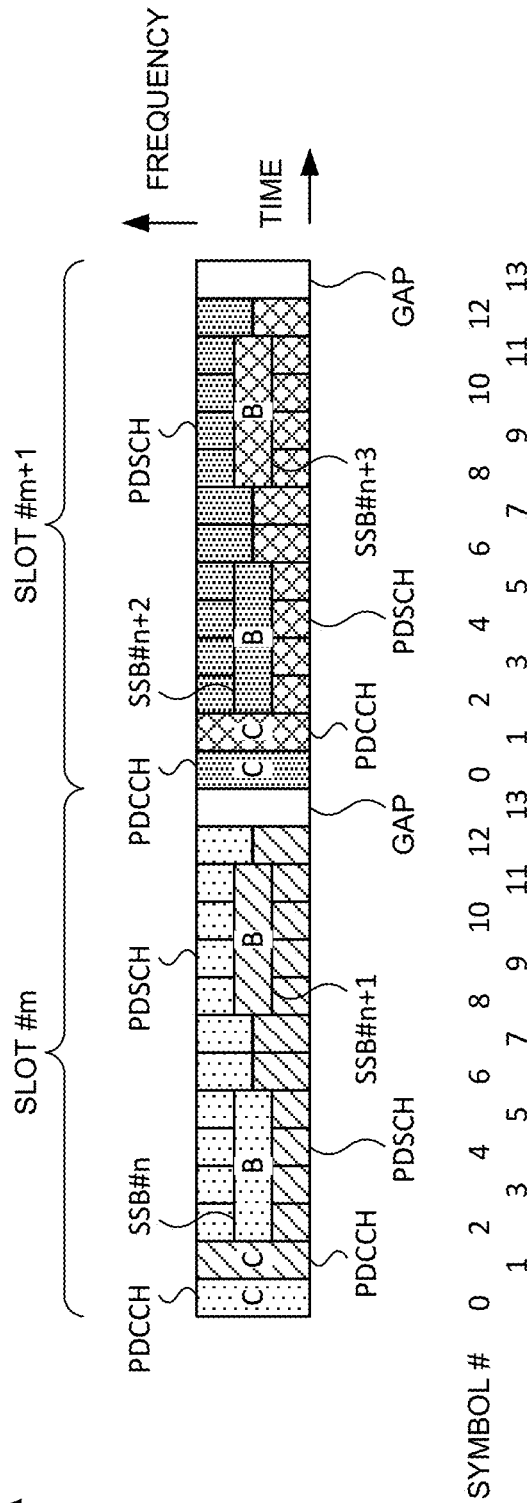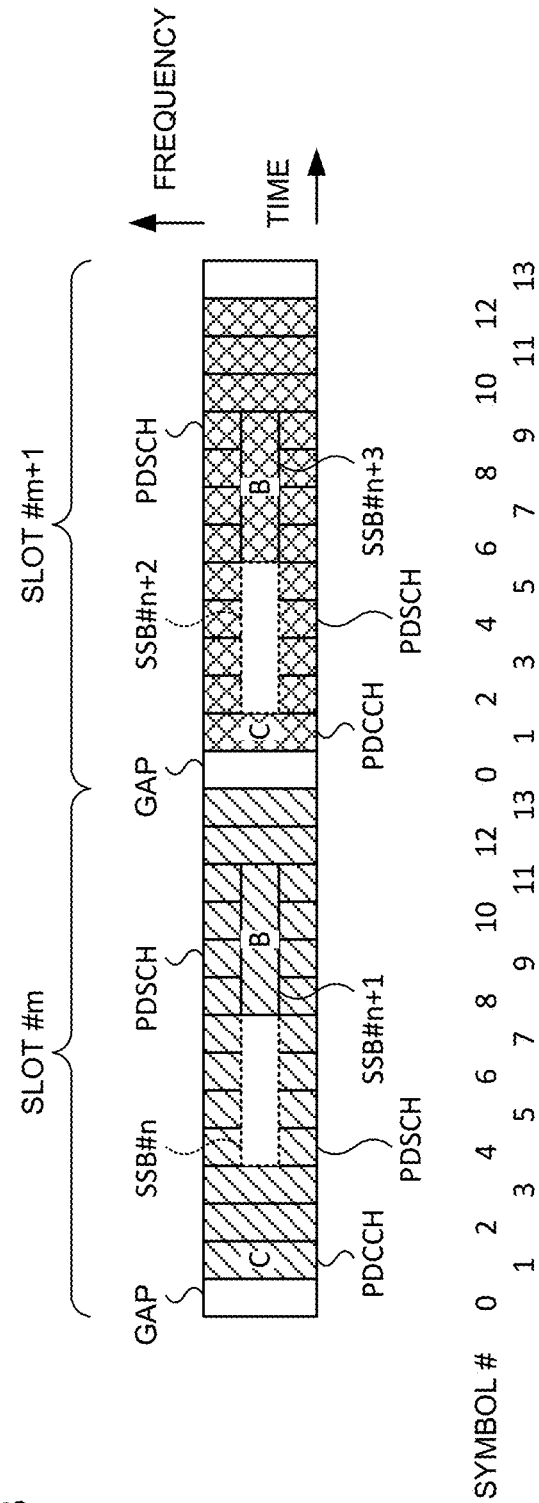

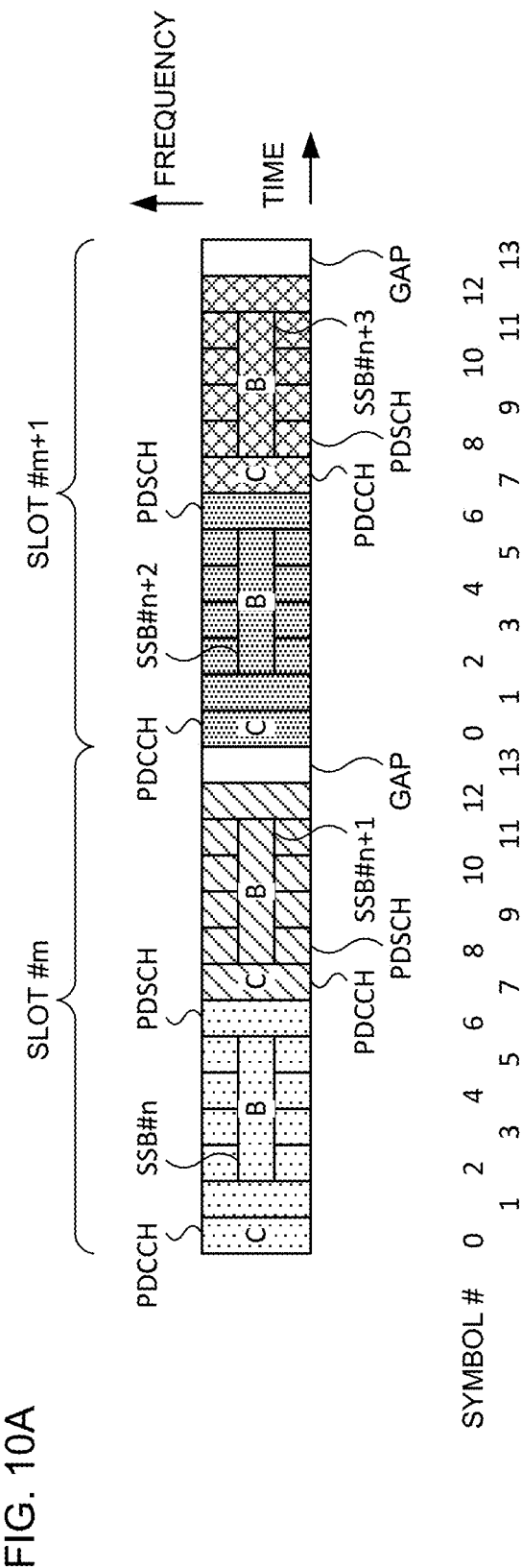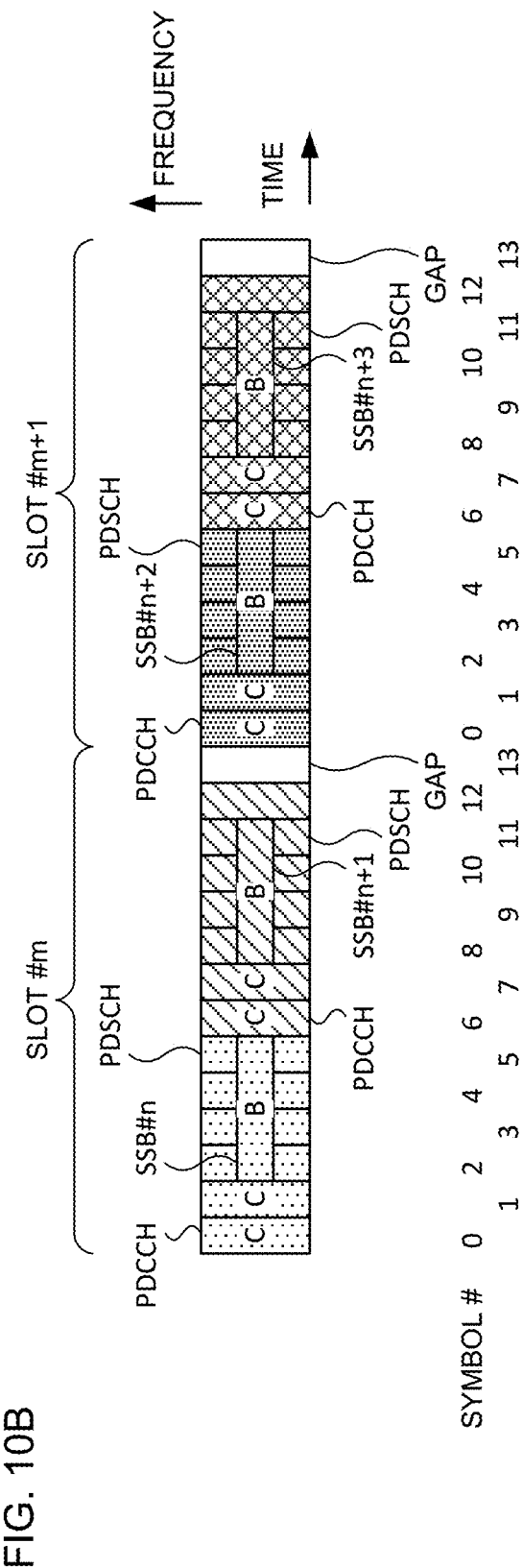

TERMINAL, RADIO COMMUNICATION METHOD AND SYSTEM USING A SENSING CHANNEL

TECHNICAL FIELD

The present disclosure relates to a user terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G plus (+)," "New Radio (NR)," "3GPP Rel. 15 (or later versions)," and so on) are also under study.

For existing LTE systems (for example, Rel. 8 to Rel. 12), specifications have been performed on the assumption that exclusive operation is performed in a frequency band (also referred to as a licensed band, a licensed carrier, a licensed component carrier (licensed CC), or the like) for which a communication operator is licensed. As the licensed CC, for example, 800 MHz, 1.7 GHz, 2 GHz, and the like are used.

For the existing LTE systems (for example, Rel. 13), in order to extend the frequency band, the use of a frequency band (also referred to as an unlicensed band, an unlicensed carrier, or an unlicensed CC) that is different from the licensed band is supported. As the unlicensed band, for example, a 2.4 GHz band, a 5 GHz band, and the like in which Wi-Fi (registered trademark) and Bluetooth (registered trademark) can be used are assumed.

Specifically, in Rel. 13, carrier aggregation (CA), whereby the carrier (CC) of the licensed band and the carrier (CC) of the unlicensed band are aggregated, is supported. Communication performed by using the unlicensed band as well as the licensed band as described above is referred to as License-Assisted Access (LAA).

Regarding the use of LAA, the use of LAA has also been under study for future radio communication systems (also referred to as, for example, 5G, 5G+, NR, 3GPP Rel. 15 or later versions, or the like). In future, dual connectivity (DC) of the licensed band and the unlicensed band and standalone (SA) of the unlicensed band may also be a subject of the study of LAA.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the future radio communication systems (for example, 5G, 5G+, NR, or Rel. 15 or later versions), a transmitting apparatus (for example, a base station in the downlink (DL) and a user terminal in the uplink (UL)) performs listening (also referred to as Listen Before Talk (LBT), Clear Channel Assessment (CCA), carrier sense, sensing of a channel, channel access operation (channel access procedure), or the like) for confirming whether or not there is transmission of another apparatus (for example, a base station, a user terminal, a Wi-Fi apparatus, or the like) before transmission of data in the unlicensed band.

In order that such a radio communication system as above coexists with another system in the unlicensed band, it is conceivable to follow regulations or requirements in the unlicensed band.

However, unless operation in the unlicensed band is clearly determined, appropriate communication may not be able to be performed in the unlicensed band, which may lead to, for example, failure in conformity of operation in a specific communication situation to the regulations and reduction of use efficiency of radio resources.

In the light of the above, the present disclosure has an object to provide a user terminal and a radio communication method that enable appropriate communication in a carrier to which listening is applied.

Solution to Problem

A user terminal according to an aspect of the present disclosure includes: a receiving section that receives a synchronization signal block, receives a downlink control channel corresponding to the synchronization signal block, and receives a downlink shared channel corresponding to the synchronization signal block; and a control section that performs operation of at least one of interpretation of downlink control information indicating a time domain resource of the downlink shared channel in the downlink control channel, determination of a monitoring occasion of the downlink control channel, rate matching of the downlink shared channel, and determination of a transmission candidate resource of the synchronization signal block. Operation in a first carrier to which sensing is applied is different from operation in a second carrier to which sensing is not applied.

Advantageous Effects of Invention

According to an aspect of the present disclosure, appropriate communication can be performed in a carrier to which sensing of a channel is applied.

BRIEF DESCRIPTION OF DRAWINGS

FIG. 2 is a diagram to show an example of a search space configuration table for FR1 and multiplexing pattern 1;

FIG. 3A and FIG. 3B are each a diagram to show an example of a search space configuration for FR1 and multiplexing pattern 1;

FIG. 4A and FIG. 4B are each a diagram to show another example of the search space configuration for FR1 and multiplexing pattern 1;

FIG. 5 is a diagram to show an example of PDSCH time domain resource allocation for the multiplexing patterns;

FIG. 6 is a diagram to show an example of default PDSCH time domain resource allocation A for a normal CP;

FIG. 7A and FIG. 7B are each a diagram to show an example of a gap at the last symbol of a slot;

FIG. 9A and FIG. 9B are each a diagram to show an example of the PDSCH time domain resource allocation according to Aspect 1;

FIG. 10A and FIG. 10B are each a diagram to show an example of the PDSCH time domain resource allocation according to Aspect 2;

DESCRIPTION OF EMBODIMENTS

Unlicensed Band

Figure 1A:
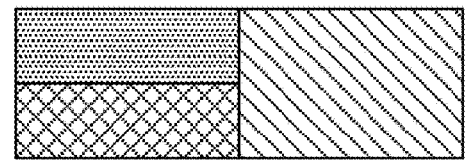
FIG. 1A to FIG. 1C are each a diagram to show an example of a multiplexing pattern.

In the unlicensed band (for example, a 2.4 GHz band and a 5 GHz band), for example, it is assumed that a plurality of systems such as a Wi-Fi system and a system (LAA system) for supporting LAA coexist, and thus it is conceivable that collision avoidance and/or interference control of transmission between the plurality of systems is required.

For example, in the Wi-Fi system using the unlicensed band, Carrier Sense Multiple Access (CSMA)/Collision Avoidance (CA) is adopted with the aim of collision avoidance and/or interference control. In CSMA/CA, a Distributed access Inter Frame Space (DIFS) is provided for a certain time period before transmission, and data transmission is performed by a transmitting apparatus after confirmation (carrier sense) of another transmit signal being absent. After data transmission, an ACKnowledgement (ACK) from the receiving apparatus is awaited. When the transmitting apparatus fails to receive the ACK within a certain time period, the transmitting apparatus determines that a collision has occurred, and performs retransmission.

In LAA of the existing LTE systems (for example, Rel. 13), the transmitting apparatus of data performs listening (also referred to as Listen Before Talk (LBT), Clear Channel Assessment (CCA), carrier sense, sensing of a channel, channel access operation, or the like) for confirming whether or not there is transmission of another apparatus (for example, a base station, a user terminal, a Wi-Fi apparatus, and the like) before transmission of data in the unlicensed band.

For example, the transmitting apparatus may be a base station (for example, a gNB (gNodeB)) in the downlink (DL), and a user terminal (for example, a User Equipment (UE)) in the uplink (UL). The receiving apparatus that receives data from the transmitting apparatus may be a user terminal in the DL and a base station in the UL, for example.

In LAA of the existing LTE systems, the transmitting apparatus starts data transmission after the elapse of a certain period (for example, immediately after or a period of back-off) since detection that there is no transmission of another apparatus in LBT (idle state).

As a channel access method in LTE LAA, the following four categories are defined.

Category 1: A node performs transmission without performing LBT.

Category 2: A node performs carrier sense in fixed sensing time before transmission, and performs transmission when a channel is available.

Category 3: A node randomly generates a value (random back-off) from a certain range before transmission, repeatedly performs carrier sense in fixed sensing slot time, and performs transmission when the node successfully confirms that a channel is available over slots having the value.

Category 4: A node randomly generates a value (random back-off) from a certain range before transmission, repeatedly performs carrier sense in fixed sensing slot time, and performs transmission when the node successfully confirms that a channel is available over slots having the value. The node changes a range (contention window size) of the random back-off value according to a communication failure situation due to collision with communication of another system.

As an LBT rule, performing LBT according to the length of a gap (a non-transmission period, a period in which received power is a certain threshold or less, or the like) between two transmissions has been under study.

The LAA system using NR may be referred to as an NR-Unlicensed (U) system, an NR LAA system, or the like. In the NR-U system, the base station (for example, the gNB) or the UE acquires a transmission opportunity (TxOP) when LBT results indicate idle, and performs transmission. The time of the transmission opportunity is referred to as Channel Occupancy Time (COT).

A scheme in which a signal including at least a Synchronization Signal (SS)/Physical Broadcast CHannel (PBCH) block (SS block (SSB)) is used in NR-U has been under study. In unlicensed band operation using the signal, the following has been under study.

There is no gap in a time range in which the signal is transmitted in at least one beam An occupied bandwidth is satisfied Channel occupancy time of the signal is minimized Characteristics of facilitating prompt channel access A signal including a Channel State Information (CSI)-Reference Signal (RS), an SSB burst set (set of SSBs), and a control resource set (CORESET) and a PDSCH that are associated with the SSB in one contiguous burst signal has been under study. The signal may be referred to as a discovery reference signal (a DRS, an NR-U DRS, or the like).

The CORESET associated with the SSB may be referred to as a Remaining Minimum System Information (RMSI)-CORESET, CORESET #0, or the like. The RMSI may be referred to as System Information Block 1 (SIB1). The PDSCH associated with the SSB may be a PDSCH (RMSI PDSCH) for carrying the RMSI, or may be a PDSCH scheduled by using a PDCCH in an RMSI-CORESET (DCI having a CRC that is scrambled with a System Information (SI)-Radio Network Temporary Identifier (RNTI)).

SSBs having different SSB indices may be transmitted by using different beams (base station transmit beams). The SSB and the RMSI PDCCH and the RMSI PDSCH that correspond to the SSB may be transmitted by using the same beam.

A node (for example, the base station or the UE) in NR-U starts transmission after confirming that a channel is available (idle) by means of LBT, because of coexistence of another system or another operator.

The node may continue transmission for a certain period after starting transmission after LBT success. Note that, when the transmission is disrupted in the middle for a certain gap period or more, the channel is possibly in use by another system, and thus LBT is required again before the next transmission. A period in which transmission can be continued depends on an LBT category to be used or a priority class in LBT. The priority class may be a contention window size for random back-off or the like. The shorter the LBT period is (the higher the priority class is), the shorter the time period in which transmission can be continued is.

A node needs to perform transmission in a wide band according to a transmission bandwidth rule in the unlicensed band. For example, the transmission bandwidth rule in Europe is 80% or more of a system bandwidth. Transmission in a narrow band may not be detected by another system or another operator that performs LBT in a wide band, and may thus collide.

It is preferable that the node be transmitted in the shortest possible time period. Reducing the channel occupancy time in each of the plurality of coexisting systems enables efficient sharing of resources by the plurality of systems.

It is preferable that the base station in NR-U transmit the SSB of different beams (beam indices, SSB indices) and the RMSI PDCCH (the PDCCH for scheduling of the RMSI PDSCH) and the RMSI PDSCH that are associated with the SSB in the widest possible band in the shortest possible time period. With this configuration, the base station can apply a high priority class (LBT category with a short LBT period) to SSB/RMSI (DRS) transmission, and it can be expected that LBT succeeds with a high probability. By performing transmission in a wide band, the base station is allowed to more easily satisfy the transmission bandwidth rule. By performing transmission in a short time period, the base station can avoid disruption of transmission.

Using 20 MHz as the bandwidth of an initial active DL BWP for NR-U has been under study. This is because a channel bandwidth of Wi-Fi being a coexisting system is 20 MHz. In this case, the SSB, the RMSI PDCCH, and the RMSI PDSCH need to be included in a 20 MHz bandwidth.

In the NR-U DRS, no gap in the transmission period of at least one beam can prevent another system from interrupting during the transmission period.

The NR-U DRS may be periodically transmitted regardless of whether or not there is a UE in an active state or a UE in an idle state. With this configuration, the base station can periodically transmit a signal required for a channel access procedure using simple LBT, and the UE can promptly access a cell of NR-U.

In the NR-U DRS, signals are closely arranged in a short time period in order to limit the number of necessary channel accesses and to implement short channel occupancy time. The NR-U DRS may support NR-U of stand-alone (SA).

Multiplexing Patterns

In Rel. 15 NR, multiplexing patterns 1 to 3 of the SSB and the RMSI are defined.

Multiplexing pattern 1: The SSB and an RMSI PDCCH CORESET (a CORESET including the RMSI PDCCH, CORESET #0) are multiplexed by time division multiplexing (Time Division Multiplex (TDM)) (FIG. 1A). In other words, the SSB and the CORESET are transmitted at different times, and the band of the CORESET includes the band of the SSB.

When the SSB and the CORESET cannot be multiplexed by frequency division multiplexing (Frequency Division Multiplex (FDM)) in a band having a narrow channel bandwidth, applying TDM is effective. When a plurality of beams can be transmitted in the same frequency and at the same time by means of digital beamforming in a low frequency band (for example, frequency range (FR) 1, 6 GHz or lower), there is no need to perform FDM with the same beam.

Figure 1B:
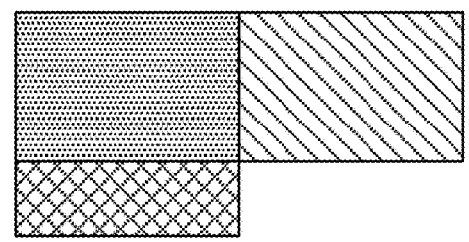

Multiplexing pattern 2: The SSB and the RMSI PDCCH CORESET are multiplexed by TDM and FDM (FIG. 1B).

When an SSB SCS (a subcarrier spacing (SCS) of the SSB) and an RMSI SCS (an SCS of the RMSI) are different from each other, or when the SSB SCS is particularly wider than the RMSI SCS, the time length (symbol length) of the SSB is reduced, and thus both of the RMSI PDCCH and the RMSI PDSCH may not be multiplexed by FDM with the SSB. In this case, the SSB and the RMSI PDCCH CORESET can be multiplexed on different time resources and different frequency resources.

When there is a restriction of using analog beamforming, the base station can transmit only one beam. By multiplexing the RMSI PDSCH with the SSB by FDM, the base station can transmit one beam in a short time period, and can reduce overhead of beam sweeping.

Figure 1C:
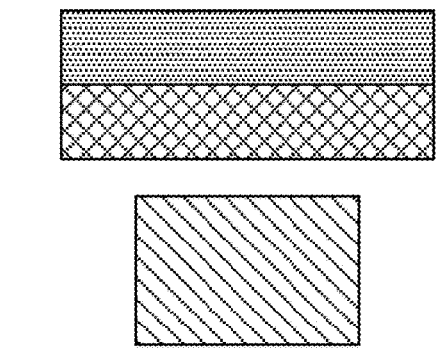

Multiplexing pattern 3: The SSB and the RMSI PDCCH CORESET are multiplexed by FDM (FIG. 1C).

By multiplexing both of the RMSI PDCCH and the RMSI PDSCH with the SSB by to FDM, the base station can transmit one beam in a short time period. By being able to switch beams for each SSB, the base station can reduce overhead of beam sweeping.

In Rel. 15 NR, an RMSI PDCCH (type 0-PDCCH common search space, search space #0) monitoring occasion for multiplexing pattern 1 and FR1 is defined as shown in a search space configuration table of FIG. 2. In FR1, only multiplexing pattern 1 is defined. The UE uses a search space configuration (PDCCH monitoring occasion) corresponding to an index (search space configuration index) that is reported by a master information block (MIB, the lowest 4 bits of pdcch-ConfigSIB1 in the MIB).

For multiplexing pattern 1, the UE monitors the PDCCH in the type 0-PDCCH common search space over two contiguous slots starting with a slot no. For the SSB having an SSB index i, the UE determines a slot index $n_0$ located in a frame having a system frame number (SFN) $SFN_c$ according to the following expression.

$$n_0 = (O \cdot 2^\mu + \lfloor i \cdot M \rfloor) \bmod N_{slot}^{frame,\mu}$$

$$SFN_C \bmod 2 = 0 \text{ if } \lfloor (O \cdot 2^\mu + \lfloor i \cdot M \rfloor)/N_{slot}^{frame,\mu} \rfloor \bmod 2 = 0$$

$$SFN_C \bmod 2 = 1 \text{ if } \lfloor (O \cdot 2^\mu + \lfloor i \cdot M \rfloor)/N_{slot}^{frame,\mu} \rfloor \bmod 2 = 1 \quad \text{[Math. 1]}$$

In the search space configuration table, O represents an offset [ms] from a slot including the first SSB (having the SSB index of 0) to a slot including a corresponding RMSI PDCCH CORESET. M is a reciprocal of the number of search space sets per slot. $\mu \in \{0, 1, 2, 3\}$ is based on the SCS (RMSI SCS) used for PDCCH reception in the CORESET. The first symbol index is an index of the first symbol of the CORESET in a slot nC. It is assumed that the number of SSBs per slot is 2.

When the UE monitors the search space set corresponding to one SSB over two slots, flexibility of scheduling can be enhanced.

FIG. 3A, FIG. 3B, FIG. 4A, and FIG. 4B show a case in which the RMSI SCS is 30 kHz and the slot length is 0.5 ms.

As shown in FIG. 3A, when the search space configuration index is 0, O is 0, the number of search space sets per slot is 1, M is 1, and the first symbol index is 0. It is assumed that the type 0-PDCCH common search space for RMSI #0 corresponding to SSB #0 in slot #0 extend over two contiguous slots #0 to #1, and the PDCCH and the PDSCH for RMSI #0 are scheduled in slot #0 out of those slots. It is assumed that because the number of search space sets per slot is 1, the type 0-PDCCH common search space of RMSI #1 corresponding to SSB #1 in slot #0 extends over the following slots #1 to #2, and the PDCCH and the PDSCH for RMSI #1 are scheduled in slot #1 out of those slots. In this manner, the relative position of the slot of the RMSI with respect to the slot of the SSB changes depending on the SSB index.

As shown in FIG. 3B, when the search space configuration index is 1, the number of search space sets per slot is 2, and thus two search spaces (PDCCHs) respectively corresponding to two SSBs can be mapped to one slot. The first symbol index of the search space is 0 with the SSB index having an even number, and the SSB index having an odd number is a symbol with an offset of the number of symbols of the CORESET (number of CORESET symbols, $N_{symb}^{CORESET}$). In the present example, two RMSI PDCCHs corresponding to two SSBs transmitted in one slot are transmitted at the start of the slot, and two corresponding RMSI PDCCHs are multiplexed by FDM in the slot. Specifically, the SSB and the RMSI PDCCH and the RMSI PDSCH that correspond to the SSB are transmitted in the same slot.

As shown in FIG. 4A, when the search space configuration index is 2, there is an offset of 2 ms from the start slot of the first SSB to the start slot of a corresponding RMSI PDCCH. Other configuration is the same as that of the case in which the search space configuration index is 0.

As shown in FIG. 4B, when the search space configuration index is 3, there is an offset of 2 ms from the start slot of the first SSB to the start slot of a corresponding RMSI PDCCH. Other configuration is the same as that of the case in which the search space configuration index is 1.

For multiplexing the SSB and CORESET #0 in NR-U, multiplexing pattern 1 is recommended. Multiplexing pattern 1 occurs in a time instance whose SS/PBCH block (SSB) is different from CORESET #0, and a band of CORESET #0 overlaps with a transmission band of the SS/PBCH block (at least a part of the band of CORESET #0 overlaps the transmission band of the SS/PBCH block).

Channel Access Procedure

As a channel access procedure for the start of the COT by the base station (gNB) as a Load Based Equipment (LBE) device, category 2 LBT and category 4 LBT have been under study. When a duty cycle of the DRS is 1/20 or less and the total time length of the DRS is 1 ms or less (when the transmission period of the DRS is 20 ms or more and the total time length of the DRS is 1 ms or less) for the DRS by itself or the DRS multiplexed with non-unicast data (for example, OSI, paging, RAR), category 2 LBT of 25 µs is used, similarly to LAA of LTE. When the duty cycle of the DRS is larger than 1/20 or when the total time length of the DRS is larger than 1 ms, category 4 LBT is used.

When the SS/PBCH block, the RMSI PDCCH corresponding to the SS/PBCH block, and the RMSI PDSCH corresponding to the SS/PBCH block are transmitted within a short time length (1 ms or less) as the NR-U DRS, category 2 LBT can be applied. In category 2 LBT being CCA of 25 µs without random back-off, a channel access success rate of the NR-U DRS can be increased as compared to category 4 LBT with random back-off.

As shown in FIG. 5, in Rel. 15 NR, time domain resource allocation of the RMSI PDSCH using multiplexing pattern 1 is default PDSCH time domain resource allocation A (default A) for a normal Cyclic Prefix (CP).

As shown in FIG. 6, in a table of the default PDSCH time domain resource allocation A for a normal CP, a PDSCH mapping type, the number KO of slots from the PDCCH to the PDSCH, a PDSCH start symbol position S, and the number of PDSCH symbols (time length) L are associated with a row index and a DMRS type A position (first DMRS symbol). The row of the table may be referred to as a time domain resource allocation pattern, an allocation pattern, or the like.

In the PDSCH time domain resource allocation A, 16 allocation patterns of the PDSCH start symbol positions and the number of PDSCH symbols are defined. However, flexible resource allocation cannot be performed in the PDSCH time domain resource allocation A. In order to satisfy the condition of category 2 LBT, it is conceivable that a gap of 25 µs or more is provided every millisecond. By reducing the length of the gap to be as short as possible, the success rate of channel access can be increased, and resource use efficiency can be enhanced.

For example, as shown in FIG. 7A and FIG. 7B, an allocation pattern (S=2, L=11) in which the PDSCH is not allocated to the last symbol of a period of 1 ms is not included in the PDSCH time domain resource allocation A. FIG. 7A shows a case in which two SSBs in one slot are not contiguous in the time domain (are separated away), as in case A of a 15 kHz SCS and case C of a 30 kHz SCS. FIG. 7B shows a case in which two SSBs in one slot are contiguous in the time domain as in case B of a 30 kHz SCS.

Rel. 15 NR defines that, when the UE receives the PDSCH scheduled by using the SI-RNTI and a system information indicator in DCI is set to 0, the UE assumes that the SS/PBCH block is not transmitted in the resource element (RE) used by the UE for reception of the PDSCH.

The frequency domain resource allocation of the PDSCH cannot be changed for each symbol, and thus when the time resource of the PDSCH includes the time resource of the SSB, the band of the SSB cannot be assigned to the PDSCH over all of the symbols of the PDSCH in order that the PDSCH does not overlap the SSB.

Information indicating an actually transmitted SSB is included in SIB1 (RMSI PDSCH), and thus the UE detects one SSB at the beginning in initial access, and at the time point of receiving SIB1, the UE does not know whether or not another SSB is transmitted. Thus, the PDSCH is mapped so as not to overlap transmission candidate positions of the SSB (transmission candidate resources, candidate SSBs, candidate SS/PBCH blocks, SSB mapping pattern) regardless of whether or not the SSB is actually transmitted.

Figure 8A:
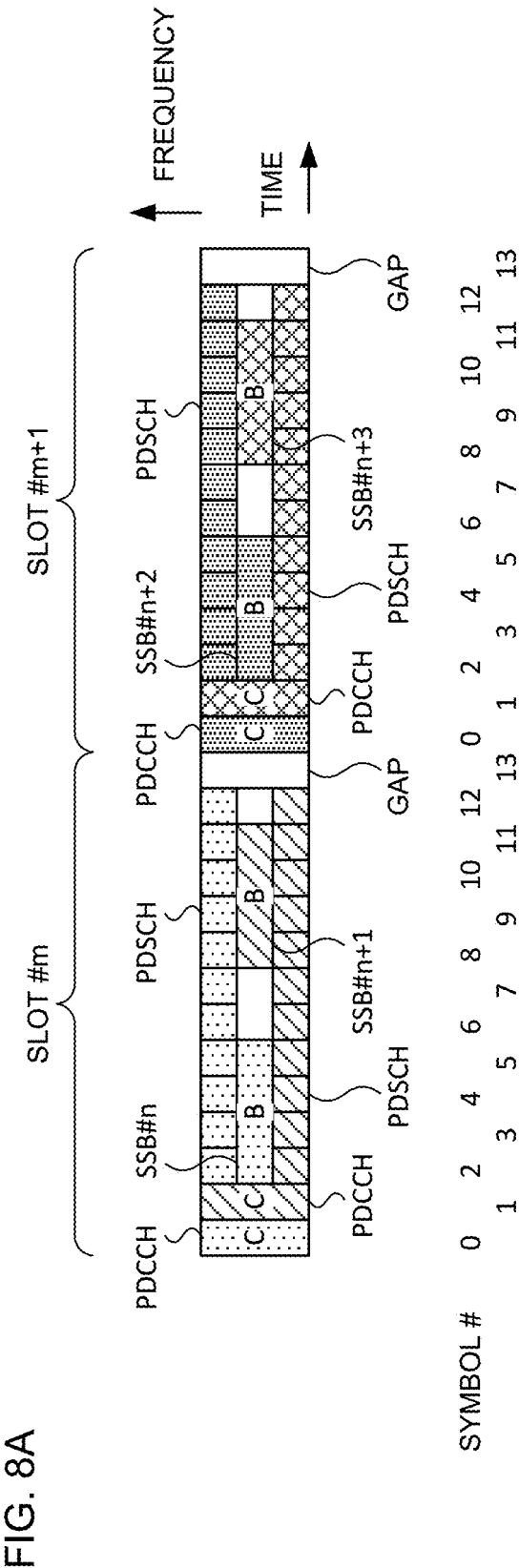
FIG. 8A and FIG. 8B are each a diagram to show an example of mapping of a PDSCH not overlapping a band of an SSB.
Figure 8B:
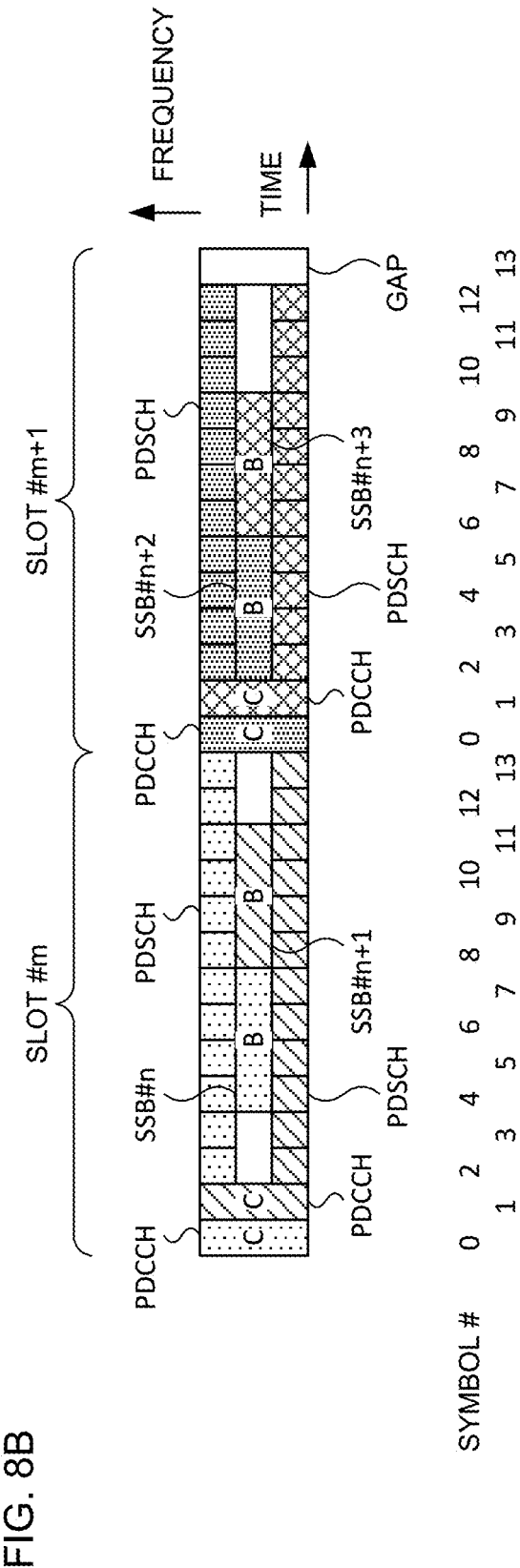

As shown in FIG. 8A, when a plurality of symbols including a symbol of the SSB transmission candidate position are assigned to the PDSCH in case A of the 15 kHz SCS and case C of the 30 kHz SCS, the PDSCH cannot be mapped to the band of the SSB not only in the symbol of the SSB transmission candidate position but also in the symbol of other than the SSB transmission candidate position. As shown in FIG. 8B, when symbols including the symbol of the SSB transmission candidate position are assigned to the PDSCH in case B of the 30 kHz SCS as well, the PDSCH cannot be mapped to the band of the SSB not only in the symbol of the SSB transmission candidate position but also in the symbol of other than the SSB transmission candidate position.

The bandwidth of the SSB is 20 PRBs, and when the band of the SSB is not assigned to the PDSCH, resource use efficiency is reduced. Transmission power in the symbol not including the SSB is lower than transmission power of the symbol including the SSB. It may be erroneously detected that transmission has ended in the symbol not including the SSB, and another system may start transmission.

When the frequency resource of the PDSCH includes the frequency resource of the SSB, only the symbols other than the SSB transmission candidate positions are assigned to the PDSCH in order that the PDSCH does not overlap the SSB. The time domain resource allocation is limited, one example of which includes the use of a PDSCH mapping type B (mini-slot).

In this manner, in Rel. 15 NR, the resource allocation of the PDSCH is limited (there are resources that cannot be assigned to the PDSCH), and thus resource use efficiency is reduced.

In this manner, unless the mapping of the RMSI PDCCH and the RMSI PDSCH that correspond to the SSB are appropriate in an NR-U target frequency (unlicensed band), deterioration of performance of a system may be caused, such as increase of a time period necessary for channel access and reduction of resource use efficiency.

In the light of this, the inventors of the present invention came up with the idea of channel mapping for the unlicensed band. The channel mapping in the unlicensed band may be different from the channel mapping in the licensed band.

With this configuration, the SSB and the RMSI PDCCH and the RMSI PDSCH that correspond to the SSB can be transmitted in a short time period, and reduction of a channel access time period, enhancement of resource use efficiency, and the like can be implemented.

Embodiments according to the present disclosure will be described in detail below with reference to the drawings. A radio communication method according to each embodiment may be individually applied, or may be applied in combination.

In the present disclosure, the NR-U target frequency may be interpreted as a carrier (cell, CC) of a first frequency band (unlicensed band, unlicensed spectrum), an LAA SCell, an LAA cell, a primary cell (PCell, a Primary Secondary Cell (PSCell), a Special Cell (SpCell)), a secondary cell (SCell), or the like. An NR target frequency may be interpreted as a carrier (cell, CC) of a second frequency band (licensed band, licensed spectrum), a PCell, a PSCell, an SpCell, an SCell, a non-NR-U target frequency, Rel. 15 NR, or the like. In the NR-U target frequency and the NR target frequency, different frame structures may be used.

The radio communication system (NR-U, LAA system) may conform to a first radio communication standard (for example, NR, LTE, or the like) (support the first radio communication standard).

Another system (coexisting system, coexisting apparatus) that coexists with the radio communication system and another radio communication apparatus (coexisting apparatus) may conform to a second radio communication standard, such as Wi-Fi, Bluetooth (registered trademark), WiGig (registered trademark), a wireless LAN (Local Area Network), IEEE802.11, and an LPWA (Low Power Wide Area), that is different from the first radio communication standard (support the second radio communication standard). The coexisting system may be a system that receives interference from the radio communication system, or may be a system that gives interference to the radio communication system.

The SSB, the RMSI PDCCH, and the RMSI PDSCH corresponding to one beam (SSB index) may be interpreted as a DRS or an NR-U DRS. The SSB may be interpreted as an SS/PBCH block, a beam, a base station transmit beam, or the like.

The RMSI PDCCH may be interpreted as DCI that includes a CRC scrambled with the SI-RNTI and that includes a system information indicator being set to 0, a PDCCH for scheduling of the RMSI PDSCH, a PDCCH corresponding to the SSB, an RMSI CORESET, a Type0-PDCCH, or the like.

The RMSI PDSCH may be interpreted as a PDSCH scheduled by DCI that has a CRC scrambled with the SI-RNTI and that has a system information indicator being set to 0, a PDSCH for carrying SIB1, a PDSCH corresponding to the SSB, or the like.

For at least one of the SSB, the RMSI PDCCH, and the RMSI PDSCH, configuration of the NR target frequency may be interpreted as configuration in Rel. 15 NR.

Radio Communication Method

Aspect 1

In the NR-U target frequency, interpretation of a time domain resource assignment field (bit) included in DCI (for example, DCI format 1_0) for scheduling the RMSI PDSCH is different from interpretation of the time domain resource assignment field in another frequency (for example, the NR target frequency).

The allocation pattern (allocation pattern for NR-U) of the RMSI PDSCH in the NR-U target frequency may follow at least one of the following Aspects 1-1 and 1-2.

Aspect 1-1

In the allocation pattern (allocation pattern for NR-U) used for the RMSI PDSCH in the NR-U target frequency, a gap that can be used for category 2 LBT can be mapped.

In the allocation pattern for NR-U, the last symbol of the slot need not be assigned to the PDSCH.

The search space in FIG. 9A is similar to FIG. 3B, and two search spaces (RMSI PDCCHs) respectively corresponding to two SSBs are mapped to one slot, and the number of CORESET symbols is 1. The start symbol of the RMSI PDCCH corresponding to the SSB index having an even number is symbol #0, and the start symbol of the RMSI PDCCH corresponding to the SSB index having an odd number is symbol #1. Two RMSI PDSCHs respectively corresponding to two RMSI PDCCHs are multiplexed by FDM in the same slot. Specifically, the SSB and the RMSI PDCCH and the RMSI PDSCH that correspond to the SSB are transmitted in the same slot.

The SSB transmission candidate positions in FIG. 9A are of case A of the 15 kHz SCS or case C of the 30 kHz SCS, and the transmission candidate positions of SSBs #n and #n+1 are separated away in the time domain. Both of SSBs #n and #n+1 are actually transmitted in slot #m (slot index having an even number, the first slot out of two contiguous slots). Both of SSBs #n+2 and #n+3 are actually transmitted in slot #m+1 (slot index having an odd number, the second slot out of two contiguous slots).

With the allocation pattern for NR-U indicating S=2 and L=11, and by not assigning the last symbol of each slot to the PDSCH, the last symbol of each slot can be made to be a gap. In a case of the 15 kHz SCS, the length of one symbol is approximately 71 µs, and in a case of the 30 kHz SCS, the length of one symbol is approximately 36 µs, and thus the base station can perform LBT (category 2 LBT) of 25 μs in the gap before transmission of the NR-U DRS.

In FIG. 9A, when SSBs #n and #n+2 are actually transmitted and SSBs #n+1 and #n+3 are not transmitted, the PDCCH and the RMSI PDSCH corresponding to SSBs #n and #n+2 are actually transmitted, and the PDCCH and the PDSCH corresponding to SSBs #n+1 and #n+3 are not transmitted. With the allocation pattern for NR-U indicating S=1 and L=12, and by not assigning the last symbol of each slot to the PDSCH, the last symbol of each slot can be made to be a gap.

In FIG. 9A, when the number of CORESET symbols is 3, SSBs #n and #n+2 are actually transmitted, and SSBs #n+1 and #n+3 are not transmitted, the PDCCH and the PDSCH corresponding to SSBs #n and #n+2 are actually transmitted, and the PDCCH and the PDSCH corresponding to SSBs #n+1 and #n+3 are not transmitted. With the allocation pattern for NR-U indicating S=3 and L=10, and by not assigning the last symbol of each slot to the PDSCH, the last symbol of each slot can be made to be a gap.

The search space in FIG. 9B is similar to FIG. 9A. The SSB transmission candidate positions of FIG. 9B are of case B of the 30 kHz SCS, and the transmission candidate positions of SSBs and #n+1 are contiguous in the time domain. In slot #m, SSB #n is not transmitted, and only SSB #n+1 is actually transmitted. In slot #m+1, SSB #n+2 is not transmitted, and only SSB #n+3 is actually transmitted. Thus, the PDCCH and the PDSCH corresponding to SSBs #n and #n+2 are not transmitted, and the PDCCH and the PDSCH corresponding to SSBs #n+1 and #n+3 are actually transmitted.

In Rel. 15 NR, the start symbol of the PDCCH monitoring occasion (type 0-PDCCH common search space) corresponding to the first SSB transmission candidate positions (SSB indices having even numbers (0, 2, . . . )) in the slot is the start symbol of the slot, and the symbol index of the start symbol of the PDCCH monitoring occasion corresponding to the second SSB transmission candidate positions (SSB indices having odd numbers (1, 3, . . . )) in the slot is the number of CORESET symbols (symbol that is the number of CORESET symbols after the start symbol of the slot). When the number of CORESET symbols is 1, SSBs #n and #n+2 are not transmitted, and SSBs #n+1 and #n+3 are transmitted, the start symbol of each slot is not assigned to the RMSI PDCCH, and the start symbol of each slot can be made to be a gap.

With the allocation pattern for NR-U indicating S=2 and L=12, allocation to the PDSCH can be performed until the last symbol of each slot.

Aspect 1-2

When two SSBs in one slot are separated away in the time domain as in case A and case C, a signal (DRS) including the SSB, the PDCCH, and the PDSCH corresponding to one SSB index may be contiguous in the time domain. The DRS corresponding to different SSB indices may be multiplexed by TDM.

According to the signal mapping as described above, when the PDCCH corresponding to one SSB index cannot be transmitted due to a failure (busy) of LBT, LBT can be performed before transmission of the PDCCH corresponding to the next SSB index.

When two PDCCHs are contiguous in the time domain as shown in FIG. 9B, the probability that the next PDCCH can be transmitted after the transmission of the PDCCH fails due to LBT is reduced. Even if the transmission of the SSB is enabled in the middle of the slot, the PDSCH cannot be transmitted unless a corresponding PDCCH mapped before the enabling is transmitted. The UE may fail to appropriately operate such as in a manner that the UE interprets that the cell does not support SA, and thus the base station transmitting only the SSB and not transmitting corresponding RMSI is not preferable.

As shown in FIG. 10A, when the number of CORESET symbols is 1, the allocation pattern for NR-U of the PDSCH corresponding to SSBs #n and #n+2 may be S=1 and L=6, and the allocation pattern for NR-U of the RMSI PDSCH corresponding to SSBs #n+1 and #n+3 may be S=8 and L=5. With this configuration, a contiguous signal (DRS) including SSB #n+1, the PDCCH corresponding to SSB #n+1, and the PDSCH corresponding to SSB #n+1 can be transmitted after a contiguous signal including SSB #n, the PDCCH corresponding to SSB #n, and the PDSCH corresponding to SSB #n, and when LBT indicates idle after transmission of the PDCCH corresponding to SSB #n fails due to LBT busy, a contiguous signal including the PDCCH corresponding to SSB #n+1 and the PDSCH corresponding to SSB #n+1 can be transmitted, and thus the success rate of channel access can be increased. By not assigning the last symbol of each slot to the PDSCH, the last symbol of each slot can be made to be a gap.

As shown in FIG. 10B, when the number of CORESET symbols is 2, the allocation pattern for NR-U of the PDSCH corresponding to SSBs #n and #n+2 may be S=2 and L=4, and the allocation pattern for NR-U of the RMSI PDSCH corresponding to SSBs #n+1 and #n+3 may be S=8 and L=5.

In FIGS. 10A and 10B, the allocation pattern for NR-U of the PDSCH corresponding to SSB #n+1 of slot #m (slot having a slot index having an even number) may be S=8 and L=6. With this configuration, the last symbol of slot #m can be assigned to the PDSCH. In case C of the 30 kHz SCS, the length of two slots #m and #m+1 is 1 ms, and thus by mapping the PDSCH, not a gap, to the last symbol of slot #m, the probability of being interrupted by another system is reduced.

By using reserved bits of DCI (for example, DCI format 1_0) for scheduling of the RMSI PDSCH, the number of bits of the time domain resource assignment field for the NR target frequency (time domain resource assignment field for NR) may be extended with respect to the number of bits of the PDSCH time domain resource assignment field for the NR target frequency (time domain resource assignment field for NR).

The size of the time domain resource assignment field for NR-U may be the same as the size of the time domain resource assignment field for NR. In this case, a part of the allocation patterns for NR (for example, the allocation pattern having an unnecessarily long gap at the end of the slot) may be replaced with the allocation pattern for NR-U. For example, the allocation pattern whose gap at the end of the slot is two or more symbols such as the allocation pattern (row index=2, DMRS type A position=2) having S=2 and L=10 out of the allocation patterns for NR may be replaced with the allocation pattern for NR-U.

According to Aspect 1 described above, time of channel access in the NR-U target frequency can be reduced, and the success rate of channel access can be increased. Resource use efficiency can be enhanced.

Aspect 2

The monitoring occasion of the RMSI PDCCH (type 0-PDCCH common search space) in the NR-U target frequency may be different from the monitoring occasion of the RMSI PDCCH in the NR target frequency.

In the NR-U target frequency, interpretation of an identification field for CORESET #0 (ControlResourceSetZero, CORESET for type 0 PDCCH) and search space #0 (SearchSpaceZero, type0-PDCCH monitoring occasion) may be different from the interpretation of the identification field in the NR target frequency.

The identification field may be an identification field (pdcch-ConfigSIB1) in the MIB in the PBCH included in the SSB. The identification field and pdcch-ConfigSIB1 may be interpreted as PDCCH-ConfigCommon (controlResourceSetZero (CORESET configuration index, corresponding to the highest 4 bits of pdcch-ConfigSIB1) and searchSpaceZero (search space configuration index, corresponding to the lowest 4 bits of pdcch-ConfigSIB1)) that are reported to the UE by using RRC signaling.

In Rel. 15 NR, the start symbol of the SSB (SSB #n) having the SSB index having an even number is symbol #4. In the NR-U target frequency, the start symbol of the PDCCH monitoring occasion corresponding to the SSB having the SSB index having an even number in the slot (slot #m) having the slot index having an even number may be symbol #1. With this configuration, a gap of one symbol can be mapped to the start of the slot (slot #m).

In case B of the SCS of 30 kHz, two SSBs in one slot (a pair of SSB #n and SSB #n+1, a pair of SSB #n+2 and SSB #n+3) are contiguous in the time domain. In the SCS of 30 kHz, the length of two slots #m and #m+1 is 1 ms.

In the SCS of 30 kHz, the first gap of the slot (slot #m+1, the second slot out of two contiguous slots (1 ms)) having the slot index having an odd number may be absent.

The search space configuration table in the NR-U target frequency (PDCCH monitoring occasion for NR-U) may be different from the search space configuration table in the NR target frequency (PDCCH monitoring occasion for NR).

In Rel. 15 NR, as shown in the search space configuration table of FIG. 2, the start symbol index of the PDCCH monitoring occasion corresponding to the SSB index having an even number is 0, and the start symbol index of the PDCCH monitoring occasion corresponding to the SSB index having an odd number is the number of CORESET symbols.

In the slot having the slot index having an even number, the start symbol index of the PDCCH monitoring occasion corresponding to the SSB index having an even number may be 1, and the start symbol index of the PDCCH monitoring occasion corresponding to the SSB index having an odd number may be 1+number of CORESET symbols.

In the slot having the slot index having an odd number, the start symbol index of the PDCCH monitoring occasion corresponding to the SSB index having an even number may be 0, and the start symbol index of the PDCCH monitoring occasion corresponding to the SSB index having an odd number may be the number of CORESET symbols, similarly to Rel. 15 NR.

In this case, the allocation pattern for NR-U may be the same as the allocation pattern for Rel. 15 NR (allocation pattern for NR). For example, in the slot having the slot index having an even number, row index=1, DMRS type A position=3, S=3, and L=11 in a PDSCH time domain resource allocation table of Rel. 15 NR may be used. For example, in the slot having the slot index having an odd number, row index=1, DMRS type A position=2, S=2, and L=12 in the PDSCH time domain resource allocation table of Rel. 15 NR may be used.

According to the PDCCH monitoring occasion for NR-U and the allocation pattern for NR-U, it can be arranged that a gap be mapped to the start of the slot having the slot index having an even number, and a gap not be mapped to the start of the slot having the slot index having an odd number.

According to Aspect 2 described above, a gap of one symbol can be mapped to one slot or the start of two slots, category 2 LBT can be performed, and a probability of being interrupted by another system can be reduced.

Aspect 3

Rate matching of the RMSI PDSCH for the SSB in the NR-U target frequency may be different from rate matching of the RMSI PDSCH for the SSB in the NR target frequency.

In the NR-U target frequency, overlap of the band of the RMSI PDSCH and the band of the SSB may be permitted.

The UE may perform rate matching of the RMSI PDSCH in the resources at the positions of the SSB transmission candidates or the resources of the actually transmitted SSBs.

In Rel. 15, at the time point when the UE detects one SSB, the UE does not know whether or not the SSB having other than the SSB index of the one SSB is actually transmitted. Thus, the UE does not perform rate matching in reception of the RMSI PDSCH.

In the NR-U target frequency, the UE may receive the RMSI PDSCH according to at least one of the following Aspects 3-1 and 3-2.

Aspect 3-1

The UE may invariably perform rate matching of the RMSI PDSCH at the SSB transmission candidate positions.

In Rel. 15 NR, when the UE detects one SSB in one slot, the UE recognizes that there is another SSB transmission candidate position in the slot.

When the RMSI PDSCH overlapping the SSB transmission candidate position is mapped, the UE may perform rate matching of the RMSI PDSCH at the resource of the SSB transmission candidate position, regardless of whether or not the SSB at the SSB transmission candidate position is actually transmitted. In other words, when the RMSI PDSCH overlapping the SSB transmission candidate position is mapped, the UE may assume that the RMSI PDSCH is not transmitted at the resource of the SSB transmission candidate position.

Rate matching can be performed without receiving information indicating whether or not the SSB is actually transmitted from the base station, and thus overhead can be reduced.

Aspect 3-2

A PBCH payload in the SSB transmitted in one slot may include information indicating whether or not another SSB in the slot is actually transmitted. When the UE detects the SSB in one slot, the UE may perform different operation depending on whether or not another SSB in the slot is actually transmitted, based on the information in the detected SSB. The UE may determine whether or not rate matching of the PDSCH corresponding to the detected SSB is performed, based on the information.

Figure 11:
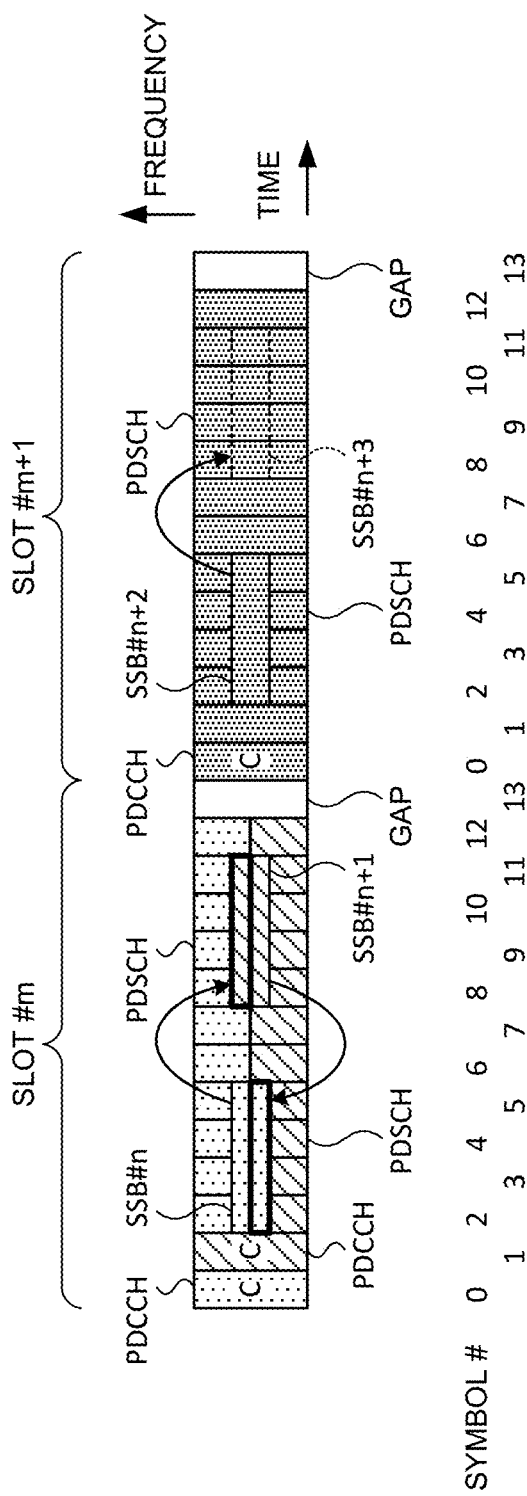
FIG. 11 is a diagram to show an example of the PDSCH time domain resource allocation according to Aspect 3.

For example, as shown in FIG. 11, when SSBs #n and #n+1 in slot #m are actually transmitted, the PBCH payload in SSB #n may include information indicating that SSB #n+1 is actually transmitted, and the PBCH payload in SSB #n+1 may include information indicating that SSB #n is actually transmitted. The UE that has detected SSB #n may perform rate matching of the PDSCH corresponding to SSB #n in the resource of SSB #n+1, based on the PBCH payload in SSB #n. The UE that has detected SSB #n+1 may perform rate matching of the PDSCH corresponding to SSB #n+1 in the resource of SSB #n, based on the PBCH payload in SSB #n+1.

For example, when only SSB #n+2 out of SSBs #n+2 and #n+3 in slot #m+1 is actually transmitted, the PBCH payload of SSB #n+2 may include information indicating that SSB #n+3 is not actually transmitted. The UE that has detected SSB #n+2 need not perform rate matching of the PDSCH corresponding to SSB #n+2 in the resource of SSB #n+3, based on the PBCH payload in SSB #n+2. The resource of SSB #n+3 that is not actually transmitted can be assigned to the PDSCH corresponding to another SSB #n+2 in the same slot, and resource use efficiency can thus be enhanced.

According to Aspect 3 described above, whether or not rate matching of the RMSI PDSCH at the SSB transmission candidate position is performed can be appropriately determined, and the UE can appropriately receive the RMSI PDSCH.

Aspect 4

The UE may determine the transmission candidate position of the SSB (SSB mapping pattern) in the slot, based on whether or not the NR-U target frequency is used.

In the NR-U target frequency, at least one of interpretation of an RMSI PDCCH configuration information (for example, PDCCHConfigSIB1, configuration information of CORESET #0, configuration information of search space #0, the monitoring occasion of the RMSI PDCCH) field and interpretation of the time domain resource assignment field in the DCI (for example, DCI format 1_0) for scheduling of the RMSI PDSCH may be associated with the SSB mapping pattern (for example, case B, case C). Case B indicates the SSB mapping pattern in which the transmission candidate positions of two SSBs in one slot are contiguous in the time domain. Case C indicates the SSB mapping pattern in which the transmission candidate positions of two SSBs in one slot are separated away in the time domain.

The UE may support only one defined in a specification out of case B and case C for the 30 kHz SCS of the NR-U target frequency.

The UE may support both of case B and case C for the 30 kHz SCS of the NR-U target frequency. The UE may receive reporting of information indicating the SSB mapping pattern of at least one of case B and case C of the 30 kHz SCS in the NR-U target frequency on the PBCH in the SSB.

A part of bits or a part of code points of the RMSI PDCCH configuration information field (for example, 8 bits) included in the PBCH in the SSB in the NR-U target frequency may indicate configuration information for case B, and the rest of the bits or the rest of the code points may indicate configuration information for case C.

Regarding the RMSI PDCCH configuration information field, for example, for case C in the NR-U target frequency, as shown in FIG. 9A or FIG. 9B, in one slot, the time resource of the PDCCH corresponding to the SSB index having an odd number (#n+1) may indicate the PDCCH monitoring occasion that is later than the time resource of the PDSCH corresponding to the SSB index having an even number (#n) (for example, the start symbol of the PDCCH corresponding to the SSB index having an odd number is symbol #6 or #7).

The UE may perform different interpretation for the time domain resource assignment field of DCI (for example, DCI format 1_0) for scheduling of the RMSI PDSCH, depending on which of case B and case C is determined (reported).

For example, regarding the time domain resource assignment field, for case C in the NR-U target frequency, as shown in FIG. 9A or FIG. 9B, the time resource of the PDSCH corresponding to the SSB index having an odd number (#n+1) may indicate the allocation pattern that follows the time resource of the PDCCH corresponding to the SSB index having an odd number (for example, the start symbol of the PDSCH corresponding to the SSB index having an odd number is symbol #8, and the length of the PDSCH is 5 or 6 symbols).

The allocation pattern as described above may be available for case C, and may not be available for case B.

The allocation pattern may be associated with the monitoring occasion of the RMSI PDCCH indicated by the RMSI PDCCH configuration information field (for example, PDCCHConfigSIB1). The UE may differently interpret the PDSCH time domain resource assignment field depending on the PDCCH monitoring occasion indicated by the RMSI PDCCH configuration information field. The row index indicated by the PDSCH time domain resource assignment field may be limited according to the PDCCH monitoring occasion indicated by the RMSI PDCCH configuration information field.

According to Aspect 4 described above, the UE can determine mapping of the SSB (SSB mapping pattern, case B, case C, and the like) in the NR-U target frequency. The UE can determine at least one of the monitoring occasion of the RMSI PDCCH and the allocation pattern of the RMSI PDSCH suitable for mapping of the SSB.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
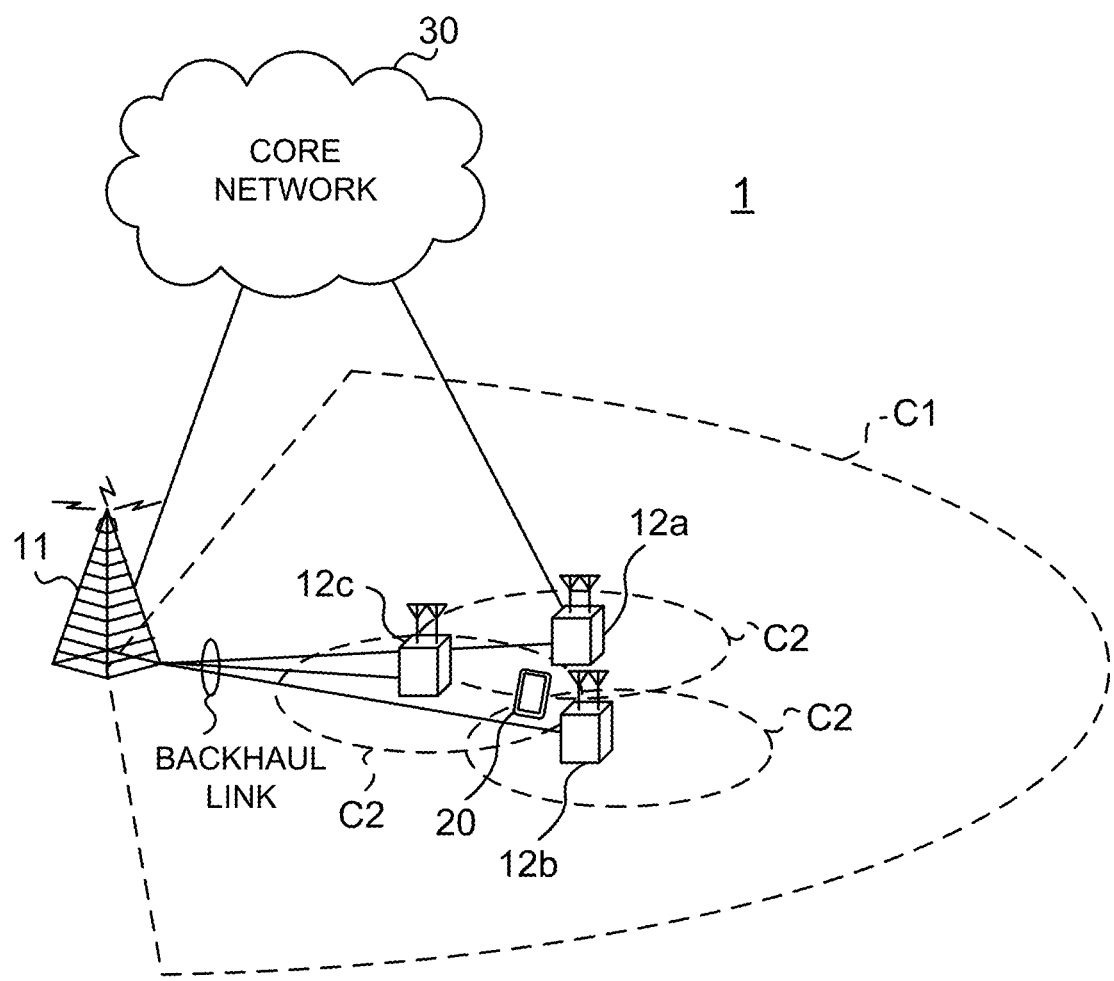
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 13:
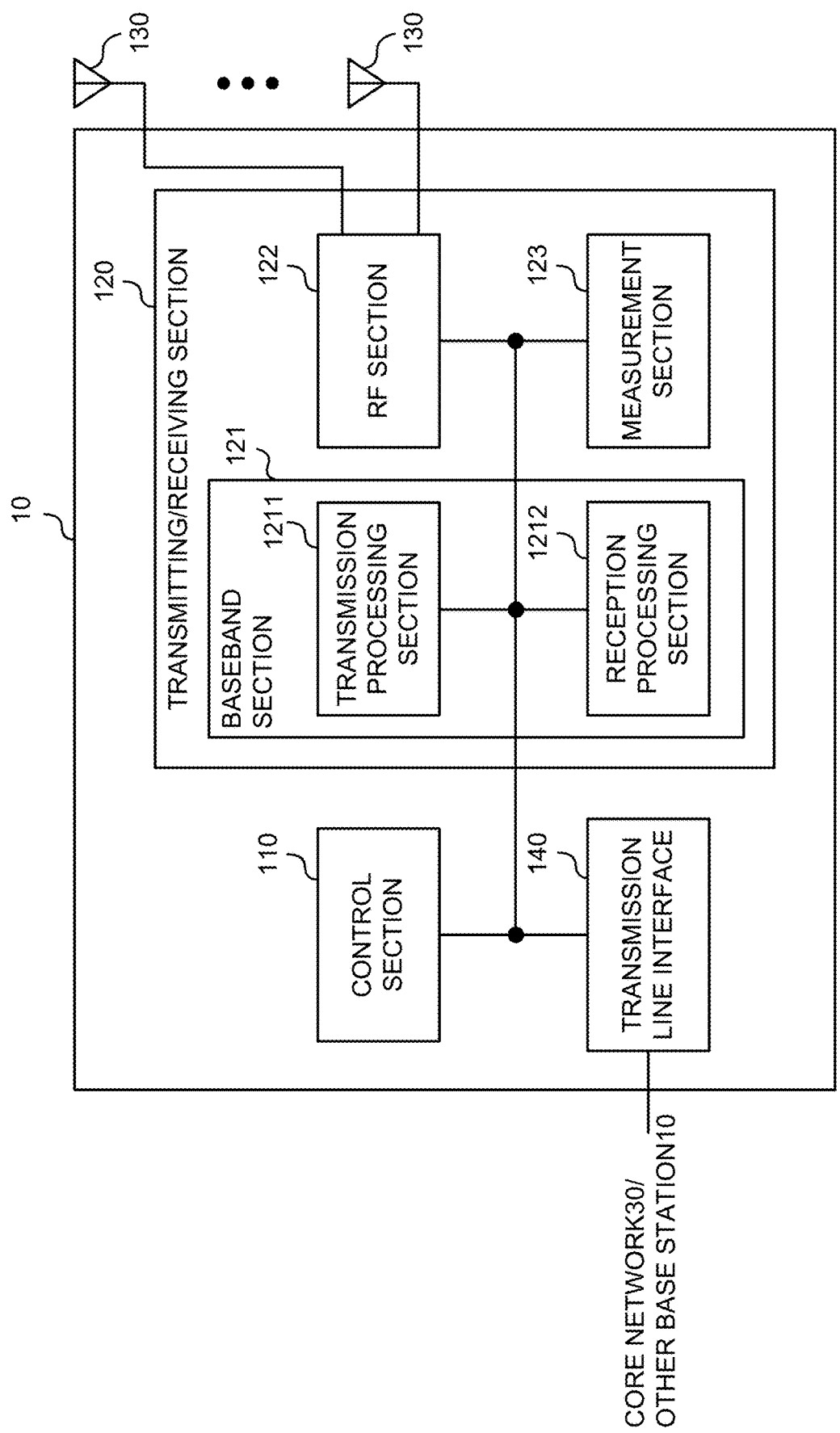
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120 and the transmitting/receiving antennas 130.

The transmitting/receiving section 120 may transmit the DRS (for example, the SSB and the RMSI PDCCH and the RMSI PDSCH that correspond to the SSB, time length of 1 ms or less) in a certain period (for example, 20 ms or more) in a first carrier (for example, the NR-U target frequency). The transmitting/receiving section 120 may perform sensing (listening, category 2 LBT) of a channel in the first carrier, and may transmit the DRS when the channel is idle.

User Terminal

Figure 14:
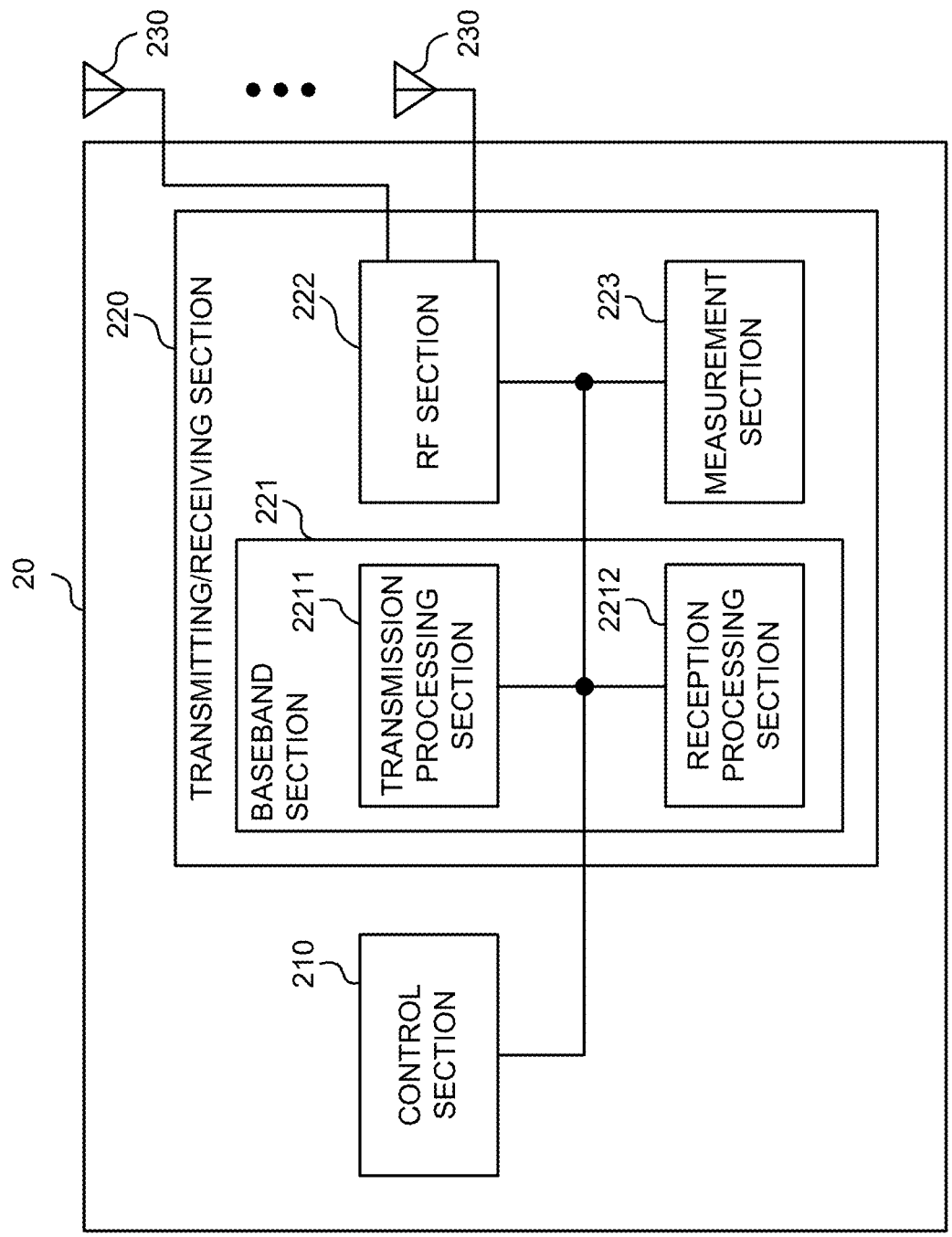
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive a synchronization signal block (SSB, SS/PBCH block), receive a downlink control channel (RMSI PDCCH) corresponding to the synchronization signal block, and receive a downlink shared channel (RMSI PDSCH) corresponding to the synchronization signal block. The control section 210 may perform operation of at least one of interpretation of downlink control information (DCI) indicating a time domain resource (time domain resource allocation) of the downlink shared channel in the downlink control channel, determination of a monitoring occasion of the downlink control channel, rate matching of the downlink shared channel, and determination of a transmission candidate resource (transmission candidate position) of the synchronization signal block. Operation in a first carrier (for example, the NR-U target frequency) to which sensing is applied may be different from operation in a second carrier (for example, the NR target frequency) to which sensing is not applied.

In the first carrier, one slot or a last one symbol of two contiguous slots may not be assigned to the downlink shared channel, or one slot or a first one symbol of the two contiguous slots may not be assigned to the downlink control channel.

When a first synchronization signal block and a second synchronization signal block in one slot are separated away in a time domain (case A, case C), the downlink control channel corresponding to the second synchronization signal block may be transmitted after the downlink shared channel corresponding to the first synchronization signal block.

The control section 210 may perform rate matching of the downlink shared channel, based on a broadcast channel (PBCH) in the synchronization signal block, or regardless of whether or not another synchronization signal block in a slot of the synchronization signal block is actually transmitted.

The control section 210 may use at least one of a monitoring occasion of the downlink control channel and time domain resource allocation of the downlink shared channel, associated with one of a first case (for example, case B) in which a first synchronization signal block and a second synchronization signal block in one slot are contiguous in a time domain and a second case (for example, case A, case C) in which the first synchronization signal block and the second synchronization signal block are not contiguous in the time domain.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
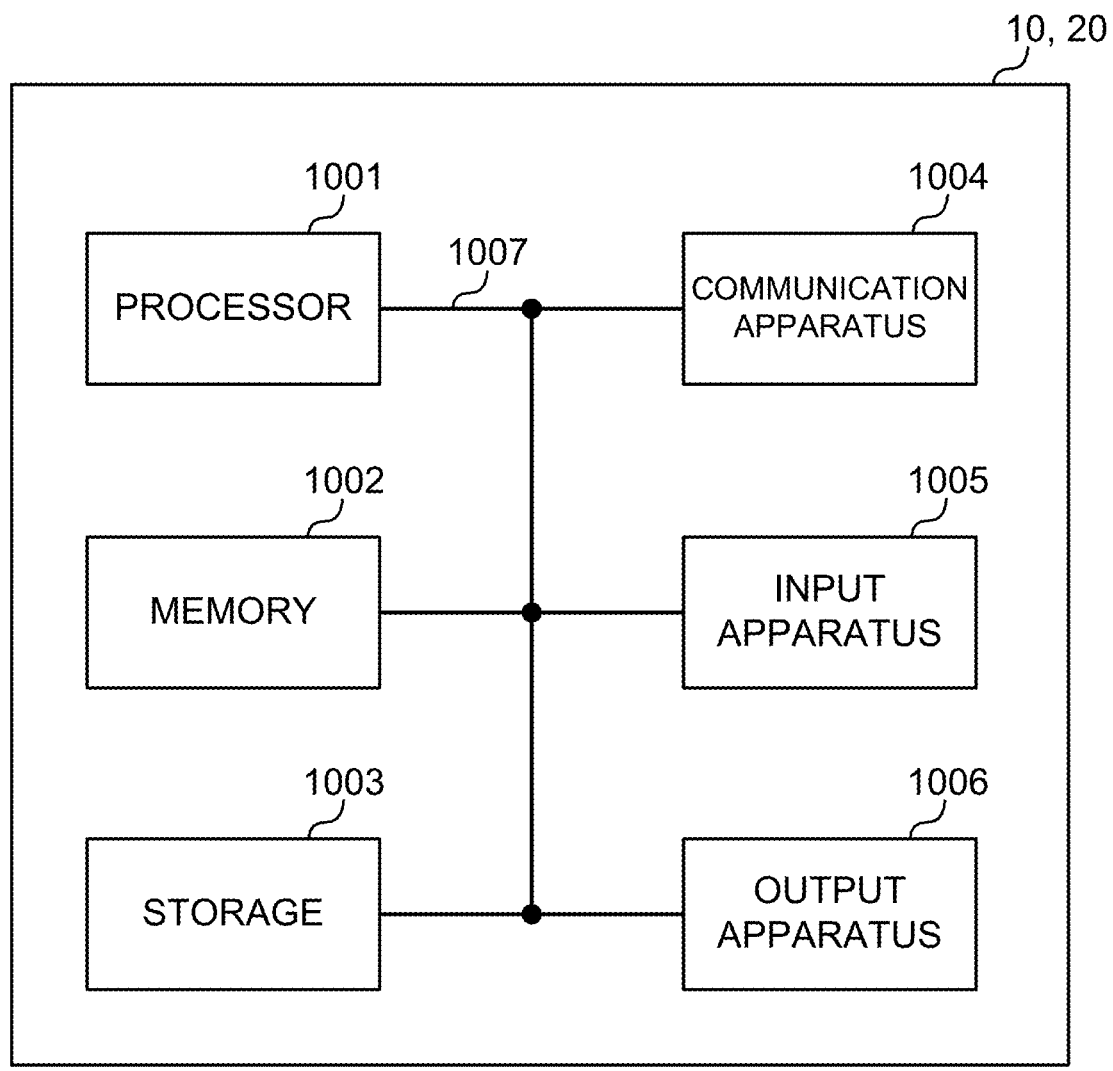
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the assignment of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names assigned to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements.

These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives a synchronization signal block, receives a downlink control channel corresponding to the synchronization signal block, and receives a downlink shared channel corresponding to the synchronization signal block; and
    a processor that performs operation of interpretation of downlink control information indicating a time domain resource of the downlink shared channel in the downlink control channel, determination of a monitoring occasion of the downlink control channel, operation in a first carrier to which sensing is applied being different from operation in a second carrier to which sensing is not applied, and
    wherein in the first carrier, a last one symbol of one slot is not assigned to the downlink shared channel.

2. The terminal according to claim 1, wherein the processor uses a monitoring occasion of the downlink control channel, associated with one of a first case in which a first synchronization signal block and a second synchronization signal block in one slot are contiguous in a time domain and a second case in which the first synchronization signal block and the second synchronization signal block are not contiguous in the time domain.

3. A radio communication method for a terminal, comprising:
    receiving a synchronization signal block, receiving a downlink control channel corresponding to the synchronization signal block, and receiving a downlink shared channel corresponding to the synchronization signal block; and
    performing operation of interpretation of downlink control information indicating a time domain resource of the downlink shared channel in the downlink control channel, determination of a monitoring occasion of the downlink control channel, operation in a first carrier to which sensing is applied being different from operation in a second carrier to which sensing is not applied, and
    wherein in the first carrier, a last one symbol of one slot is not assigned to the downlink shared channel.

4. A system comprising:
    a terminal comprising:
        a receiver that receives a synchronization signal block, receives a downlink control channel corresponding to the synchronization signal block, and receives a downlink shared channel corresponding to the synchronization signal block; and
        a processor that performs operation of interpretation of downlink control information indicating a time domain resource of the downlink shared channel in the downlink control channel, determination of a monitoring occasion of the downlink control channel, operation in a first carrier to which sensing is applied being different from operation in a second carrier to which sensing is not applied; and a base station that transmits the synchronization signal block, transmits the downlink control channel, and transmits the downlink shared channel,
wherein in the first carrier, a last one symbol of one slot is not assigned to the downlink shared channel.

* * * * *